(12) United States Patent
McAnally

(10) Patent No.: US 7,686,915 B1
(45) Date of Patent: Mar. 30, 2010

(54) VACUUM-BAGGING PROCESS USING PTFE BEADS

(75) Inventor: Kent L. McAnally, Wichita, KS (US)

(73) Assignee: Textron Innovations Inc., Providence, RI (US)

( * ) Notice: Subject to any disclaimer, the term of this patent is extended or adjusted under 35 U.S.C. 154(b) by 1289 days.

(21) Appl. No.: 11/183,337

(22) Filed: Jul. 18, 2005

(51) Int. Cl.
*B28B 7/03* (2006.01)
(52) U.S. Cl. .................................. 156/286; 156/285
(58) Field of Classification Search .................. 156/285, 156/286
See application file for complete search history.

(56) References Cited

U.S. PATENT DOCUMENTS

| | | |
|---|---|---|
| 4,755,341 A | 7/1988 | Reavely et al. |
| 4,983,341 A | 1/1991 | Kromrey |
| 5,106,568 A | 4/1992 | Honka |
| 5,348,601 A | 9/1994 | Ray |
| 2005/0077427 A1* | 4/2005 | Brenner et al. ........... 244/117 R |
| 2005/0086916 A1* | 4/2005 | Caron ........................ 55/382 |

* cited by examiner

*Primary Examiner*—Jeff Aftergut
*Assistant Examiner*—Jaeyun Lee
(74) *Attorney, Agent, or Firm*—Lathrop & Gage LLP

(57) ABSTRACT

Disclosed is a method of vacuum bagging parts being adhered with an epoxy. Polytetrafluoroethylene (PTFE) beads are disposed into a cavity defined by the parts to be adhered. These beads will flow to all of the areas of the parts and will not stick to the adhesive. Next, a bagging material is placed over the parts and beads and vacuum is created underneath the material. This administers pressure to the bag which transfers the pressure to the beads and then the parts to ensure proper curing.

17 Claims, 2 Drawing Sheets

VACUUM-BAGGING PROCESS USING PTFE BEADS

CROSS-REFERENCE TO RELATED APPLICATIONS

None.

STATEMENT REGARDING FEDERALLY SPONSORED RESEARCH OR DEVELOPMENT

None.

BACKGROUND OF THE INVENTION

1. Field of the Invention

The present invention relates generally to the field of aircraft manufacture, more specifically, to the manufacture of aircraft structures which have parts requiring the use of adhesives which must be cured in a vacuum under pressure at elevated temperatures.

2. Description of the Related Art

Aircraft wing sections or fuselage sections typically include an outer skin which is constructed of metal or composite material. The skin is reinforced from the back by a number of longitudinally extending stringers and laterally extending bulkheads or ribs. The stringers are received through openings in transversely extending bulkheads.

Fasteners such as rivets have been used to secure the stringers and bulkheads to the inside surface of the skin. Plastic-resin adhesives, e.g., carbon epoxies, have also been used.

These epoxies cannot properly bond at typical environmental temperatures or at atmospheric pressures but instead must be cured in an autoclave under negative pressure at elevated temperatures. The elevated temperatures are typically provided in an autoclave in which the skin is disposed on a tool. The upper surface of the tool may be flat, but oftentimes it is curved to accommodate contoured skin portions. To assemble the skin section, adhesive is applied between the skin and the stringer, and then the stringer is pressed against the skin with pressure in the desired orientation and location.

Before curing the epoxy adhesive, a non-porous release film and then a breather sheet are draped over the parts. The release film is a layer of film that is impermeable to and does not bond to the adhesive. Thus, it is able to contain the adhesive to keep it from sticking to the vacuum bag or other materials. The breather sheet is constructed of a loosely woven material, e.g., glass fabric, which serves as a continuous air path over the parts but does not come into contact with the epoxy.

The necessary vacuum pressure required is administered using a vacuum bag. A vacuum bag is a sheet of flexible transparent material which is initially draped over the parts which are to be adhered. Then the bagging material is sealed around its open edges using a tape or sealant. Thus, a vacuum can be created within the bag using a vacuum hose connected to a fitting on the bag.

The necessary pressure is then administered evenly to the outer surface of the bag. The uniformity of the pressure is dependent on a proper bag placement which will result in the bag engaging all of the surface area of the parts when the bag is pressurized. Because of this, proper bagging is critical to the curing process.

One thing that is problematic in this process is in the application of the bag to irregular or complex shapes, such as exist with a bulkhead/stringer intersection on the skin. Conventionally, this is accomplished by tucking the bag in to reach tight radii spots, corners, and other hard-to-reach areas. This is a time-consuming and arduous task. Employees have to meticulously place the bag with ample loose bag material around the stringers and bulkheads so that as a vacuum is drawn down on the bag, the bag is not stretched to rupture on a sharp edge. It is common for a large section having multiple stringers to take workers two hours to bag one section of structure.

Further, the task is so difficult that mistakes are common. Corners and other tight spots are oftentimes not reached by the bag because of improper bag placement, creating open spaces between the bag and the part surfaces. When this happens, air bubbles will become trapped in the epoxy during the cure creating voids. It may even cause the bag to rupture which prevents adherence of the parts.

There are also significant ergonomic and safety risks to employees having to crawl atop large tools to work the bag into corners and other complex areas.

Because of these disadvantages, there is a need in the art for a safe, efficient, and effective alternative.

SUMMARY OF THE INVENTION

The present invention overcomes these shortcomings in the prior art by providing a bagging technique using polytetrafluoroethylene (PTFE) beads. PTFE is one of several materials commonly referred to as PTFE. In the processes of the present invention, these spherical beads are disposed into the complex areas of the parts to be adhered. Next, a vacuum bag is placed over the parts and beads. Pressure is then administered to the bag which transfers the pressure to the beads and then to the parts to ensure proper bonding of the parts upon curing.

BRIEF DESCRIPTION OF THE SEVERAL VIEWS OF THE DRAWINGS

The present invention is described in detail below with reference to the attached drawing figures, wherein.

DETAILED DESCRIPTION OF THE INVENTION

Figure 1:
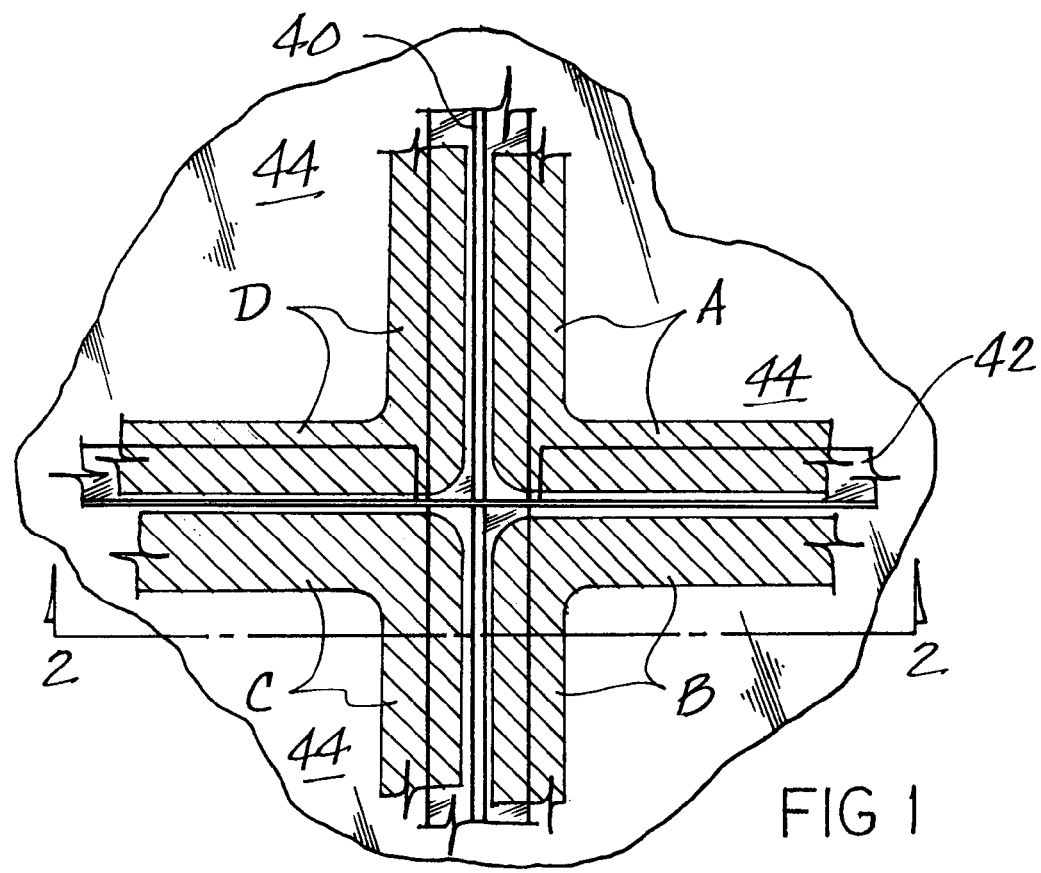
FIG. 1 is a plan view of the juncture of a stringer and bulkhead intersection showing a conventional vacuum bagging technique causing bridging problems.
Figure 2:
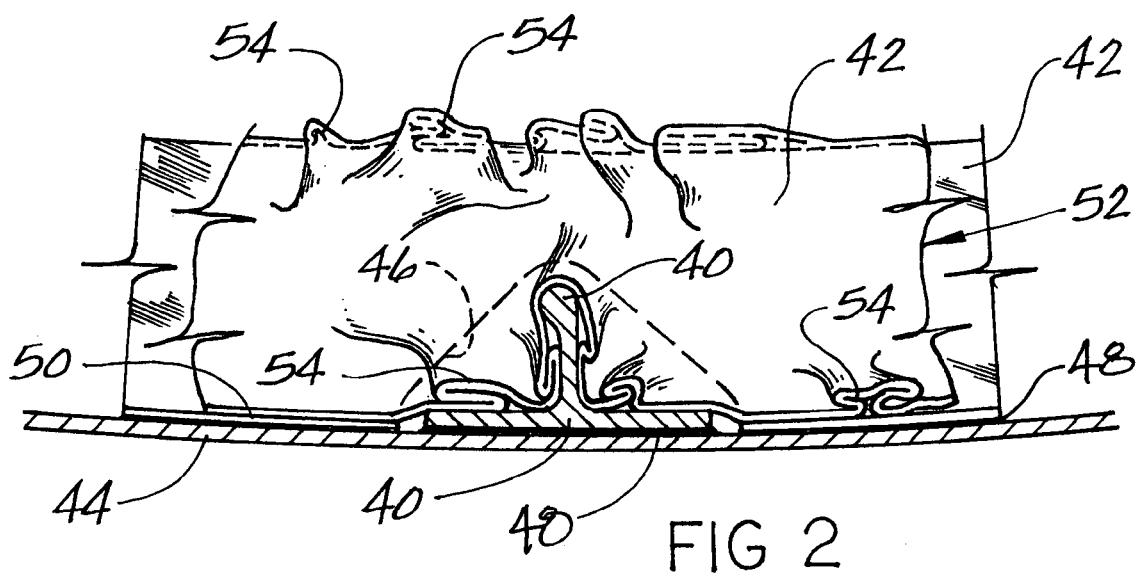
FIG. 2 is a cross-sectional view along line 2-2 of FIG. 1.

FIGS. 1 and 2 illustrate the prior art method of bagging parts prior to placing them in the autoclave. FIG. 1 illustrates the intersection of a stringer 40 with a bulkhead 42 positioned on skin 44 in preparation for bonding. Stringer 40 passes through an opening 46 in bulkhead 42 as shown in FIG. 2. A layer of adhesive 48 is positioned between skin 44 and the flanges of stringer 40. Bulkhead 42 is typically u-shape in cross-section, with its lower flange 50 bonded to skin 44 by a layer of adhesive 48. Bagging material 52 is draped over this structural intersection of the stringer and bulkhead with various areas 54 folded over itself so that when the vacuum bag is evacuated, there are no areas or crevasses wherein the bag material is stretched. If there is any stretched area of the bag material over a sharp edge of the part, there is the possibility of bag rupture. In viewing FIG. 1 the folded over areas 54 are shown by areas A, B, C, and D.

The present invention provides a method for vacuum bagging using PTFE beads. The method overcomes the deficiencies in the prior art processes. For one, the technique prevents the possibility of bridging or voids because the beads will disperse to fill all of the vacant or hard-to-reach spots in one or more cavities or other areas defined by the parts being bonded or adhered. This ensures that these hard-to-reach spots will be equally pressurized. It also prevents bag rupture.

The process is also more efficient and less dangerous. There is no need for the arduous task of working the bagging into tight corners or other hard-to-reach areas. This is because the PTFE beads actually flow like a fluid to fill these tight spots. The employees need only pour them on top of the parts being adhered and then deploy the vacuum bag over the beads. This has been found to reduce by 80% the time required for the bagging portion of the process. Further, the process is safer because the employees are not asked to stand up on elevated tools for extended periods of time.

Yet another advantage is that the use of the beads creates a plurality of small air passageways which enable the evacuation of air from the cavity including the epoxy-coated parts to be cured. This eliminates the need for the use of a release film or a breather sheet necessary in the prior art methods.

An autoclave (not shown) is used in the processes of the present invention. Also used is a tool 10 which may be seen in cross section in FIG. 3. Referring to the figure, tool 10 includes a molding surface 12, which is recessed into tool 10. Tool 10 also includes plateau portions 24 at each edge of the recessed portion of the tool. Plateau portions 24 will be used to fix the edges of a vacuum-bagging apparatus 20. Molding surface 12 is used to receive a first part 14. Here, first part 14 is a sheet of aluminum-alloy metal which will be used to construct the skin section for a wing, fuselage, or other part of an aircraft. Though not critical to understanding here, those skilled in the art will recognize that skin 14 will extend longitudinally in and out of the page along and inside the molding surface 12.

Figure 3:
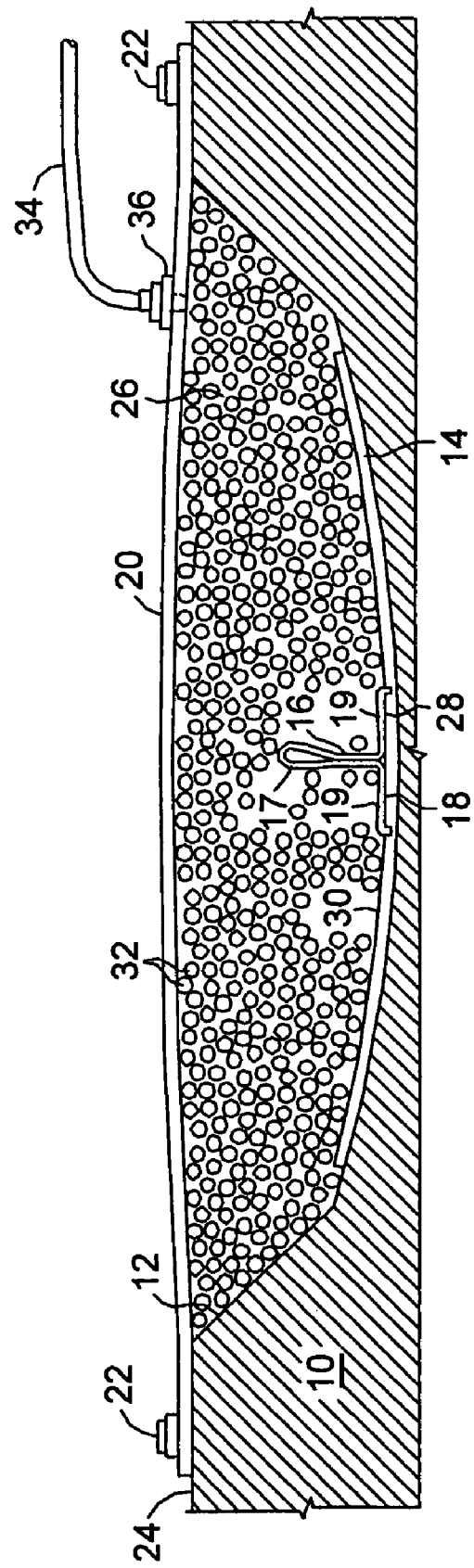
FIG. 3 is a cross-sectional view of the process of the present invention showing the tooling, the parts being bonded, PTFE beads, and vacuum bag.

A second part 16 is also shown in FIG. 3. Second part 16 will be adhered to first part 14. Second part 16 as shown in FIG. 3 comprises a single metal stringer. Stringer 16 in the figure has an upwardly extending portion 17 which is adapted to be transversely secured in through a plurality of ribs or bulkheads (not shown) which will exist in the airplane to which the skin portion 14 is later attached. At the bottom of stringer 16 are a pair of flanges 19 underneath which the epoxy will be disposed to adhere the stringer to the skin. Stringers can be extruded or formed, they can have various other cross-sectional shapes than T-shaped such as L-shaped or channel-shaped.

First and second parts together define a cavity 26. The term "cavity" will be used repeatedly throughout this disclosure. Though a particular embodiment is shown in FIG. 3 and described in detail herein, the meaning of this term should not be restricted to any of the specific embodiments disclosed. Rather, the term as used herein is to be defined as any open area defined by the parts to be adhered that is capable of receiving the beads. Though the embodiment disclosed in FIG. 3 is shown in cross section, it should be understood that cavity 26 runs longitudinally in a trough shape as will be recognized by those skilled in the art.

Though only one stringer is shown in the FIG. 3 embodiment for simplicity, it will be understood to those in the art that numerous stringers will normally be adhered to a skin portion at once. The concepts of the present invention, however, could easily be extended to adhere multiple stringers at once to the inside of a skin portion which intersect with bulkheads as shown in FIGS. 1 and 2 and in actuality, it is more common that multiple stringers and bulkheads would be adhered in one autoclave treatment.

It should also be understood that the adhesion principles of the present invention should not be limited to the particular parts disclosed. Though FIG. 3 shows a specific skin/stringer arrangement, the concepts of the present invention would apply equally as well to the bonding of numerous other parts or devices disclosed.

The principles of the present invention would also apply where the composition of the parts is different. Though the parts in the preferred embodiment are constructed of aluminum alloys, the principles of the present invention would also work where the adhered parts are constructed of other metals, composites, plastics, ceramics, other materials, or where the two parts are of different compositions.

It should also be noted that these processes could be used with any parts, in or outside the aircraft industry in which vacuum bagging is used. Thus, these techniques are not limited to the adherence of stringers, ribs or bulkheads to the skin.

Furthermore, the processes could be used in situations in which the tool did not include a recessed cavity so long as other means were provided to contain the PTFE beads. For example, some airplane parts define irregularly shaped non-flat enclosed areas, rather than recesses. In these situations the principles of the present invention might be accomplished by filling the enclosure with beads under pressure. Thus, the present invention should not be considered as limited to the FIG. 3 arrangement.

The PTFE beads 32 of the present invention are substantially spherical. Other shapes could be used, but substantially spherical beads have been selected here because they tend to flow better than other shapes.

In the preferred embodiment, PTFE is the selected material. One of several materials marketed as PTFE®, PTFE is a polymer compound, which has an extremely low coefficient of friction for a solid material. Specifically, PTFE has a static coefficient of friction in the range of 0.12 to 0.15 and a dynamic coefficient of friction between 0.05 and 0.10. These properties make PTFE a superior material to comprise the beads used in these processes because it causes the beads to easily settle into void areas and also prevents them from sticking to any exposed adhesive. Another reason PTFE is ideal is that the beads are very unreactive and thus are safely used around any reactive chemicals used in these vacuum-bagging or other related processes. Further, PTFE's melting point, which is around 327° C., enables it to survive autoclave temperatures (which are about 225° C.). Additionally, PTFE beads, like those shown in FIG. 3, are readily commercially available.

The use of other polymers is also a possibility. For example, perfluoroalkoxy polymer resin (PFA), fluorinated ethylene propylene (FEP), and ethylene tetrafluoroethylene (ETFE) are also polymers which could be used. These compounds, though chemically different from PTFE, are also referred to as PTFE® in the marketplace. Like PTFE, these compounds also have high melt points and low coefficients of friction making them possible alternatives to PTFE. PFA has a melting point of about 306° C. and a static coefficient of friction of 0.2. FEP has a melting point of 260° C., a static coefficient of friction in the range of 0.12 to 0.20, and a dynamic coefficient of friction in the range of 0.08 to 0.3. ETFE has a melt point of about 287° C., a static coefficient of friction in the range of 0.24 and 0.50, and a dynamic coefficient of friction in the range of 0.3 to 0.4. It is also possible that other materials could be used as well. Ideally, the bead selected should be constructed of a material which has a melt point above autoclave temperatures which are typically around 225° C. The beads should also be constructed such that they have minimal static and dynamic coefficients of friction.

Though the polymer balls 32 used in the preferred embodiment are disclosed as being solid PTFE, it is also possible that the balls could instead have a different core material, e.g., metal, but be coated with PTFE or some other nonstick substance.

The beads should also be small enough to deliver uniform pressure when they are compressed. If the beads are too big, the engagement areas of the beads with the parts to be adhered will be too spread out and thus, the pressure applied to the parts will be inconsistent. Thus, it is preferred that these balls should be in the range of about 5 mm to 9 mm. This ensures that the beads will apply sufficiently uniform pressure in the autoclave.

Vacuum bags 20 like that shown in FIG. 3 will be known to those skilled in the art. They are constructed of a flexible impermeable membrane underneath which a vacuum can be created and by which pressure can be applied to epoxies or adhesives so that they may be cured to set up. A vacuum bag must be sealed at all places along its periphery in order to maintain the vacuum. In FIG. 3 this is shown being accomplished using a sealant 22, but a sealing tape could be used instead.

The processes of the present invention begin with placing first part 14 on the molding surface 12 of tool 10 inside cavity 26 as shown in FIG. 3. Next, plastic resin adhesive 18 is applied to the undersides of the flanged portions 19 of stringer 16. Once coated, the bottom of the stringer will be placed in the appropriate location on upper surface 30 of skin 14. Stringer 16 will then be positioned as it appears in FIG. 3 atop the skin. An example of adhesive would be cytec Fm/73c/OST.

Next, cavity 26 is filled with the PTFE beads 32 to a level at or slightly above the level of plateau 24. The beads 32 will flow like a fluid in the trough-shaped cavity 26 to precisely fill all the internal surfaces of the tool defined by molding surface 12 and all of the exposed surfaces of parts 14 and 16. The PTFE beads will completely fill all of the areas in the cavity despite nooks, crevices, overhangs, recesses, corners, or pockets and, thus will overcome dilemmas created by these shape irregularities in the prior art processes.

Once the cavity 26 has been filled with the beads, vacuum bag 20 is placed over tool 10 as shown in FIG. 3 and sealed using a sealant 22 (or alternatively a sealing tape) to create a gas-tight environment. This effectively seals the cavity so that a vacuum can be maintained therein.

It is then time to evacuate the cavity to create the necessary vacuum. This is typically done by connecting a vacuum tube 34 to a fitting 36 in bag 20 in a manner known to those skilled in the art. Alternatively, the vacuum could be administered through a conduit in the tool not shown. This technique is also known to those skilled in the art. Regardless of the method used to administer the vacuum, the PTFE balls 32 will not interfere with the evacuation process. This is because the conglomeration of balls in the cavity will define a number of air passageways. Though the balls will be compressed together somewhat when the pressures are administrated, there will still be slight gaps. During the evacuation of air from the cavity using the vacuum bag, the air is able to escape through these gaps.

Once the vacuum is created in cavity 26 using the vacuum tube 34, the adhesive is cured by administering autoclave pressures and temperatures. The autoclave pressures will cause bag 20 to be drawn into the cavity and to press against the beads 32. This pressure will then be transferred to the assembled parts 14 and 18, compressing them together in the desired state. The pressures against the parts will be much more uniform than possible with the prior art methods. This is because the beads spread the pressure equally to all of the corners, nooks, and other hard-to-reach areas. These areas posed problems when manual placement techniques were used because it was difficult to place the bag in a way that with sufficient folds of loose bag material once evacuated, the bag areas are not ruptured from excessive stretching. If the bag ruptures during curing in the autoclave, the assembly and bag go to scrap which is a substantial cost factor.

While elevated pressures are maintained, temperatures in the autoclave are also raised to desired levels for optimal curing—typically about 225° C.

Prolonged exposure to the elevated pressures and temperatures in the vacuum will result in parts 14 and 16 being bonded together by the resin adhesive without voids (air trapped in the cured adhesive)—a common dilemma with the prior art methods.

In addition to avoiding imperfections in setting up the adhesive, using the process of the present invention also saves resources. Conventionally, irregularly shaped parts required people to painstakingly work the vacuum bag into these spots as shown in FIGS. 1 and 2. Here, however, this tucking process is completely unnecessary, enabling the workers to complete the process in about 20% of the time required using the prior art processes.

Another advantage to the methods of the present invention is that because the adhesive will not stick to the PTFE beads, there is no need for a protective film or layer to be used to prevent bead/adhesive contact. Because they are comprised of the nonstick PTFE, the beads will not be contaminated by any leaking adhesive during curing. Additionally, the beads will not adhere to any of the parts on which epoxy has accidentally leaked. Thus, protective release film and breather sheet is unnecessary.

Further, the integrity of the beads is not compromised by these processes. The epoxy/adhesive will not stick to them. Further, they are able to endure the elevated temperatures in the autoclave without degrading. Thus, after they are removed from the tool, they are can be reused indefinitely.

Although the present invention has been described and discussed with primary emphasis on one preferred embodiment, it should be obvious that adaptations and modifications can be made thereto without departing from the spirit and scope of the invention.

As can be seen, the present invention and its equivalents are well adapted to provide a new and useful vacuum-bagging method. Many different arrangements of the process disclosed, as well as steps not discussed, are possible without departing from the spirit and scope of the present invention.

The present invention has been described in relation to particular embodiments, which are intended in all respects to be illustrative rather than restrictive. Alternative embodiments will become apparent to those skilled in the art that do not depart from its scope. Many alternative embodiments exist but are not included because of the nature of this invention. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the order described.

The invention claimed is:

1. A method of curing an adhesive between a first part and a second part under pressure, said first part defining at least a portion of a cavity which includes at least a portion of said second part, said method comprising:
providing a plurality of substantially ball-shaped devices, said devices being comprised of a material (i) having a melting point above 225° C., (ii) being selected from the group of materials consisting of polytetrafluoroethylene (PTFE), perfluoroalkoxy polymer (PFA), fluorinated ethylene propylene (FEP), and ethylene tetrafluoroethylene (ETFE), and (iii) having a coefficient of friction which is low enough to prevent said adhesive from sticking to said devices;
depositing said plurality of devices into said cavity; and
compressing said devices during curing of said adhesive.

2. The method of claim 1 wherein said providing step comprises:
selecting polymer balls to serve as said plurality of ball-shaped devices.

3. The method of claim 1 comprising:
placing said first part in a tool, said tool also defining said at least a portion of said cavity.

4. The method of claim 1 comprising:
elevating environmental temperatures.

5. The method of claim 1 comprising:
locating said first and second parts in an autoclave;
using said autoclave to elevate environmental temperatures and pressures; and
accomplishing said pressing step by transferring said environmental pressures to said devices through a medium.

6. The method of claim 1 comprising:
locating said first and second parts in a vessel having an environment;
providing a gas-tight barrier between said devices and said environment; and
elevating pressures in said environment to accomplish said pressing step.

7. The method of claim 1 comprising:
using a vacuum bag to enclose said cavity.

8. The method of claim 7 comprising:
evacuating air from said cavity using said vacuum bag.

9. The method of claim 1 comprising:
providing a skin to serve as said first part.

10. The method of claim 1 comprising:
providing a stringer to serve as said second part.

11. The method of claim 1 comprising:
providing a skin to serve as said first part and at least one stringer to serve as said second part; and
manufacturing an airplane using said first and second parts.

12. The method of claim 1 comprising:
selecting first and second parts which are constructed of a metal.

13. The method of claim 1 comprising:
selecting first and second parts which are constructed of an aluminum alloy.

14. The method of claim 1 wherein said pressing step comprises:
selecting first and second parts which are constructed of an aluminum alloy.

15. A method of adhering a longitudinally-extending reinforcement member to an aircraft skin using an epoxy in a recessed area defined by said skin, said method comprising:
filling said recessed area with a plurality of substantially spherical objects, said objects (i) having diameters of between 5 mm and 9 mm, (ii) being comprised of a material having a melting point above 225° C., (iii) having a static coefficient of friction in the range of about 0.12 to about 0.50, (iv) having a dynamic coefficient of friction in the range of about 0.05 to about 0.4, and (v) being selected from the group of materials consisting of polytetrafluoroethylene (PTFE), perfluoroalkoxy polymer (PFA), fluorinated ethylene propylene (FEP), and ethylene tetrafluoroethylene (ETFE);
depositing said plurality of objects into said recessed area;
creating a vacuum in said recessed area using a gas-impermeable membrane; and
administering pressure to said gas-impermeable membrane to compress said objects to transfer uniform pressure to said reinforcement member and said skin.

16. The method of claim 15 wherein said creating step comprises:
withdrawing air through air passageways defined by said objects to evacuate said cavity.

17. The method of claim 15 wherein said administering step comprises:
elevating pressures using an autoclave.

* * * * *